(12) United States Patent
Schmidhuber

(10) Patent No.: US 8,129,636 B2
(45) Date of Patent: Mar. 6, 2012

(54) WEIGHING APPARATUS COMPRISING A PRODUCT TRANSPORT SURFACE COMPRISING GROOVES

(75) Inventor: Josef Schmidhuber, Kraiburg (DE)

(73) Assignee: Multipond Waegetechnik GmbH, Waldkraiburg (DE)

( * ) Notice: Subject to any disclaimer, the term of this patent is extended or adjusted under 35 U.S.C. 154(b) by 298 days.

(21) Appl. No.: 12/448,100

(22) PCT Filed: Dec. 21, 2006

(86) PCT No.: PCT/EP2006/012401
§ 371 (c)(1),
(2), (4) Date: Jun. 8, 2009

(87) PCT Pub. No.: WO2008/074354
PCT Pub. Date: Jun. 26, 2008

(65) Prior Publication Data
US 2010/0018781 A1    Jan. 28, 2010

(51) Int. Cl.
*G01G 19/387* (2006.01)
*B65G 25/00* (2006.01)

(52) U.S. Cl. ............. 177/25.18; 177/119; 198/772; 414/525.1; 366/109

(58) Field of Classification Search ............. 177/25.18, 177/119, 253, 262; 198/752.1, 755, 772; 414/525.1, 525.3, 525.7; 366/109
See application file for complete search history.

(56) References Cited

U.S. PATENT DOCUMENTS

| 2,819,047 | A |   | 1/1958 | Carrier, Jr. |
| 4,068,029 | A | * | 1/1978 | Armstrong .................. 428/89 |
| 5,156,259 | A | * | 10/1992 | Quaeck ..................... 198/750.2 |
| 5,646,374 | A | * | 7/1997 | Stapp et al. ................ 177/25.18 |
| 2002/0005335 | A1 | * | 1/2002 | Dussault et al. ............. 198/772 |
| 2002/0166705 | A1 | * | 11/2002 | Swayze ....................... 177/253 |
| 2003/0177658 | A1 | * | 9/2003 | Suer .............................. 34/182 |
| 2006/0060453 | A1 | * | 3/2006 | Matsumoto et al. .......... 198/772 |

FOREIGN PATENT DOCUMENTS
AU          445 032         1/1971

\* cited by examiner

*Primary Examiner* — Randy W Gibson
(74) *Attorney, Agent, or Firm* — George W. Neuner; Edwards Wildman Palmer LLP

(57) ABSTRACT

A weighing apparatus is described having a product transport surface (24) for transporting products thereon in a transporting direction (26). The product transport surface (24) has a plurality of grooves (28) which extend substantially parallel to each other and transversely to the transporting direction (26). In a cross section along the transporting direction (26), the upward sloping edges (32) and the downward sloping edges (30) of the grooves (28) form a saw tooth profile, wherein, when viewed in the transporting direction (26), each transition from the upward sloping edge (32) to the downward sloping edge (30) of two adjacent grooves (28) is sharp-edged. The product transport surface is particularly adapted for the transport of products having a soft, flexible and/or sticky surface. Also described are product transporting members in a weighing apparatus which are provided with such a product transport surface.

17 Claims, 4 Drawing Sheets

WEIGHING APPARATUS COMPRISING A PRODUCT TRANSPORT SURFACE COMPRISING GROOVES

Figure 1:
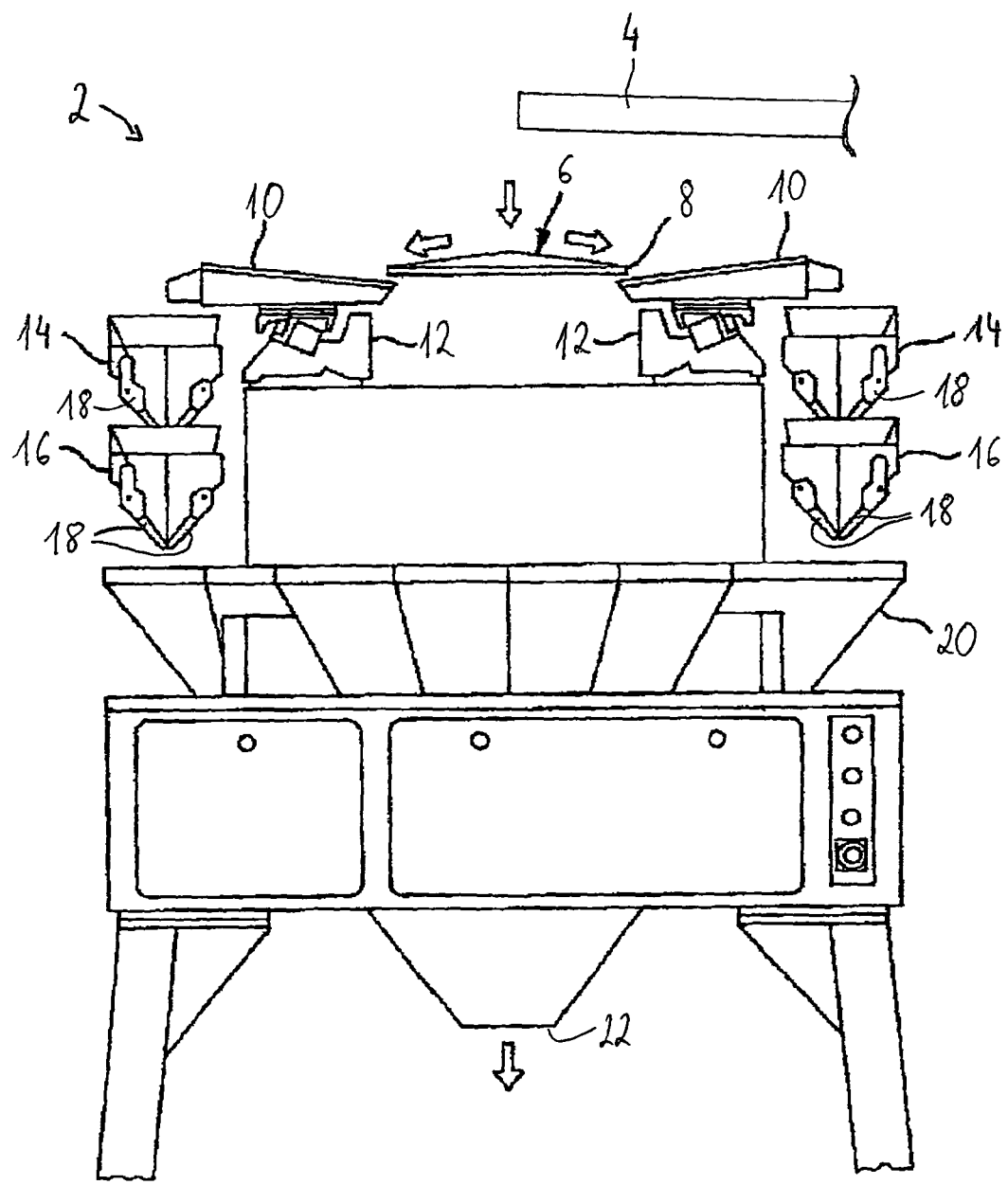

The present invention relates to a weighing apparatus comprising a product transport surface.

Further, a product transporting member in a weighing apparatus for transporting a product to be weighed and/or for transporting a weighed product, a manufacturing process for a product transport surface and the use of such a product transport surface in a weighing apparatus are disclosed.

When products are transported by fixed or moving transporting members, adhesive forces and frictional forces occur at the contact area of the product transporting members and the surface of the products. For transporting a product along a transporting direction, the transporting members are, for example, slanted such that the product is moved by gravitational force. Further, the product may be moved on a transporting member by vibration of said transporting member, for example by attaching the transport member to a vibration motor.

Depending on the consistency and surface texture of the transported product, different adhesive and frictional forces occur. In particular, when products having a soft and flexible surface are transported, the product surface snuggles against the transport surface of the transport member. In such cases, there are large contact areas between the product and the transporting member which leads to high adhesive and frictional forces. Accordingly, part of the product remains stuck on the transport surface which makes a continuous and smooth transport of the product impossible.

In particular, such problems occur when transporting products having a soft, flexible and/or sticky surface in a weighing apparatus. In such a weighing apparatus, the products to be weighed must be transported to the weighing receptacle and after the weighing operation, the products must be transported to an outlet which leads, for example, into a packaging machine. Products to be weighed with such a weighing apparatus are typically food stuffs or pharmaceutical products. In the food sector and pharmaceutical sector, the products to be weighed often have a soft, flexible and/or sticky surface. In the food sector, products having a soft, flexible and sticky surface are, for example, pieces of meat, pieces of fruits, leafs of salad, etc. Typically, a combinatorial weighing apparatus is employed as a weighing apparatus for the products in the food and pharmaceutical sector.

In conventional weighing apparatuses, transporting members having a structured surface have been employed in order to achieve a smooth and continuous transport of the products. These conventional structures had continuous and smooth contours. However, with such conventional structures, the problem occurs that in case of products having a soft, flexible and/or sticky surface, a smooth and continuous transport of such products can not be achieved. The products rather stick to such product transport surfaces having the smooth and continuous contours.

Accordingly, it is an object of the present invention to provide a weighing apparatus comprising a product transport surface which allows a continuous and smooth transport of products having a soft, flexible and/or sticky surface. In particular, a continuous and smooth transport of products of the food and pharmaceutical sector shall be achieved in a weighing apparatus.

The object is solved by a weighing apparatus comprising a product transport surface according to claim 1. Further preferred embodiments of the present invention are subject-matter of the sub-claims. In particular, the present invention also relates to a product transporting member according to claim 12 and to a manufacturing process of a product transport surface according to claim 13.

According to the present invention, the product transport surface comprises a plurality of grooves which extend substantially parallel to each other. In a cross section taken along the transporting direction which extends in an angle to the extension direction of the grooves, the upward and downward sloping edges of the grooves form a saw tooth profile. Further, when viewed in the transporting direction, each transition from the upward sloping edge to the downward sloping edge of two adjacent grooves is sharp-edged.

In this present application, with "upward sloping edge", reference is made to the edge or face of each groove which extends, when viewed in the transporting direction, upward towards the product to be transported. Conversely, with "downward sloping edge", reference is made to the edge or face of each groove which extends, when viewed in the transporting direction, downwards away from the product to be transported.

In the product transport surface as defined above, a ridge is formed between two adjacent grooves. The ridge has a top edge extending transversely to the transporting direction and being sharp-edged. Accordingly, the plurality of grooves as described above form a plurality of ridges each having a sharp edge at the top thereof.

When the product is transported on such a product transport surface in a transporting direction, the contact area between the product and the product transport surface is restricted to the top edges of the plurality of ridges and thus, the contact area is small. Accordingly, the adhesive and frictional forces are low. Further, as the transporting direction is arranged transversely to the extension direction of the grooves, it is avoided that the ridges cut into the product while the product is transported. In case that the product transport surface is vibrated, for example by a vibration motor, the impact forces can be effectively transmitted to the product via the sharp-edged top edges of the plurality of ridges. By the provision of the sharp-edged transition, adherence of product parts or contamination is avoided and thus, contamination of the product transport surface is reduced. Further, it has been observed that by the provision of such a sharp-edged transition, the transported products pick up product parts or contamination sticking on the product transport surface more effectively and thus, the self-cleaning effect is enhanced.

By the provision of the sharp-edged transition, the product is only in contact with the upper part of the plurality of ridges. It is thereby avoided that the product surface of the products snuggles downward along the faces or edges of the grooves. Accordingly, even when transporting soft products, atmospheric pressure is maintained in the bottom of the grooves. Thus, the occurrence of negative pressure when the product is lifted upwards and moved forward—e.g. by vibration of the product transport surface—is avoided. In particular, when the product is lifted upwards and moved forward any negative pressure can instantly be compensated by an airflow along the grooves beneath the product to be transported. Thus, a continuous and smooth transport of the product can be achieved.

According to a further embodiment of the present invention, it is provided that, when viewed in the transporting direction, the inclination angle of the upward sloping edges differs from the inclination angle of the downward sloping edges. The "inclination angle" of the upward sloping edge is hereby defined as the angle between the upward sloping edge and the plane formed by the product transport surface. Accordingly, also the "inclination angle" of the downward sloping edge is defined as the angle formed between the downward sloping edge and the plane formed by the product transport surface.

According to a preferred embodiment of the present invention, the inclination angle of the upward sloping edges is smaller than the inclination angle of the downward sloping edges. By the provision of such an asymmetric profile, the angle of the face directed to the transporting direction of each ridge with regard to the product surface is preferable. Thus, an effective transmission of the impact forces can be achieved when the product transport surface is vibrated. Further, as the upward sloping edge of each ridge is inclined gently in the transporting direction, a gentle transport of the product can be achieved. Accordingly, the danger of damaging the product is minimized.

According to a further embodiment of the present invention, the grooves extend substantially perpendicular to the transporting direction. Under substantially perpendicular, a range of 90°±5° is understood. As mentioned above, in such an arrangement it is avoided that the sharp-edged ridges formed between the grooves cut deeply into the products. Thus, a smooth transport can be achieved and the danger of damaging the products can be minimized.

According to a further embodiment of the present invention, when viewed in the transporting direction, the transition from the downward sloping edge to the upward sloping edge of each groove is sharp-edged. By the provision of such a sharp-edged bottom of each groove, it is further avoided that the product surface of the products snuggles downward to the bottom of the grooves. Accordingly, the occurrence of negative pressure when the product is lifted upwards and moved forward—e.g. by vibration of the product transport surface—is further avoided, as is discussed above with regard to claim 1. In particular, when the product is lifted upwards and moved forward, any negative pressure can instantly be compensated by an airflow along the grooves beneath the products to be transported.

The material of the product transport surface depends on the product to be transported. Preferred materials are metal, in particular steel, or a synthetic material, in particular PE (polyethylene), PVC (polyvinyl chloride), PTFE (polytetrafluoroethylene) or POM (polyoxymethylene).

Also the dimensions of the grooves depend on the product to be transported. However, in weighing apparatuses in the food and pharmaceutical sector, the following dimensions are preferable:

For the width of each groove, i.e. the distance between two transitions from the upward sloping edge to the downward sloping edge of adjacent grooves, a range of 1-20 mm is suitable, and a range of 2-10 mm is preferable. The width of each groove corresponds, at the same time, to the distance between the top edges of two adjacent ridges.

Further, for the depth of each groove, i.e. the distance from the bottom of each groove to the top of the adjacent ridge, a range of 0.2-10 mm is suitable, and a range of 0.4-5 mm is preferable.

For the angle between each downward sloping edge and an adjacent upward sloping edge, a range of 45°-135° is suitable, and a range of 70°-110° is preferable. This angle corresponds, at the same time, to the angle formed between each upward sloping edge and an adjacent downward sloping edge, when viewed in the transporting direction.

According to a further preferred embodiment of the present invention, each upward sloping edge is formed of a first upward sloping edge and a second intermediate edge. The first upward sloping edge is arranged after the preceding downward sloping edge, when viewed in the transporting direction. The second intermediate edge is arranged between each first upward sloping edge and the following downward sloping edge, when viewed in the transporting direction. The inclination angle of the second intermediate edge differs from the inclination angle of the first upward sloping edge, wherein the inclination angle is defined as mentioned above. By the provision of such a second intermediate edge, the product contact surface is slightly enlarged. However, the sharp-edged transition (here: between the second intermediate edge of the upward sloping edge and the downward sloping edge) according to the present invention is still maintained. By the provision of such an intermediate edge, a more gentle transport of the product can be achieved.

Such a profile comprising the second intermediate edge is, for example, preferable as a product transport surface of a conveyor trough of a combinatorial weighing apparatus, as will be discussed with reference to the figures below.

According to a further embodiment, each second intermediate edge is sloping upward when viewed in the transporting direction, wherein the inclination angle of the second intermediate edge is smaller than the inclination angle of the first upward sloping edge. According to a further embodiment, each intermediate edge is substantially parallel to the plane formed by the product transport surface. Under substantially parallel, an inclination angle of the second intermediate edge with regard to the plane formed by the product-transport surface in the range of 0°±5° is understood.

As is discussed above, the dimensions of the profile of the grooves depend on the product to be transported. However, for a product transport surface in weighing apparatuses for the transport of products in the food and/or pharmaceutical sector, the following dimensions are preferable:

For the width of each groove (as defined above) a range of 1-30 mm is suitable and a range of 2-15 mm is preferable. Further, for a width of the second intermediate edge along the transporting direction, a range of 0.2-10 mm is suitable, while a range of 0.3-5 mm is preferable.

Further, for a first height of the first upward sloping edge with regard to the bottom of the grooves, a range of 0.2-10 mm is suitable, while a range of 0.4-5 mm is preferable.

For a second height of the second intermediate edge with regard to the bottom of the grooves, a range of 0.2-10 mm is suitable, and a range of 0.4-5 mm is preferable. With regard to the first and the second height, it is to be mentioned that this height is dimensioned in a direction perpendicular to the plane formed by the product transport surface, as is also obvious from the figures.

Further, for an angle formed between each downward sloping edge and an adjacent first upward sloping edge, a range of 45°-135° is suitable, while a range of 70°-110° is preferable.

According to a further embodiment, the surface of a product transporting member for transporting a product to be weighed and/or for transporting a weighed product in a weighing apparatus, in particular in a combinatorial weighing apparatus, is formed as a product transport surface as defined above. In particular, such a product transporting member is a transport conveyor, a central dispersing device, a conveyor trough, a flap of a supply container or a weighing container for discharging product from the respective container, or a hopper of a combinatorial weighing apparatus. In such a product transporting member, the advantages as discussed above with regard to the product transport surface are achieved.

According to a further embodiment, also a manufacturing process of a product transport surface as defined above is provided. According to this manufacturing process, the grooves are formed by milling, by embossing or by rolling a sheet or plate of raw material, or, in case of a synthetic material, by an injection-moulding process such that, when viewed in the transporting direction, each transition from the upward sloping edge to the downward sloping edge of two adjacent grooves is sharp-edged.

Figure 2:
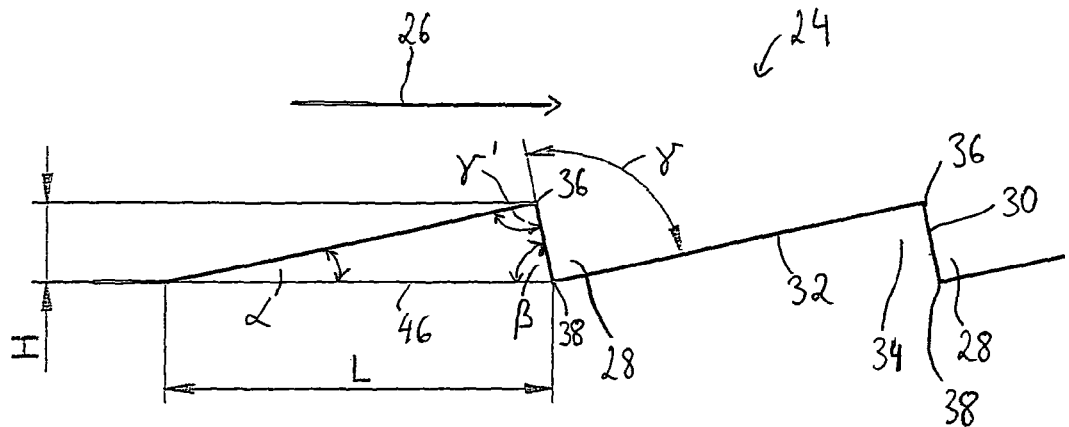
Figure 3:
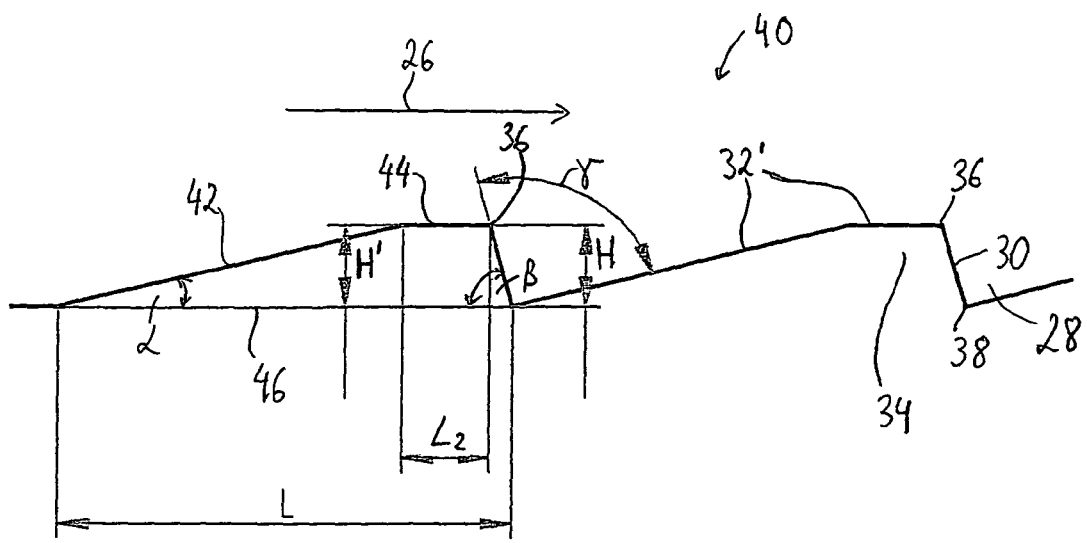
Figure 4:
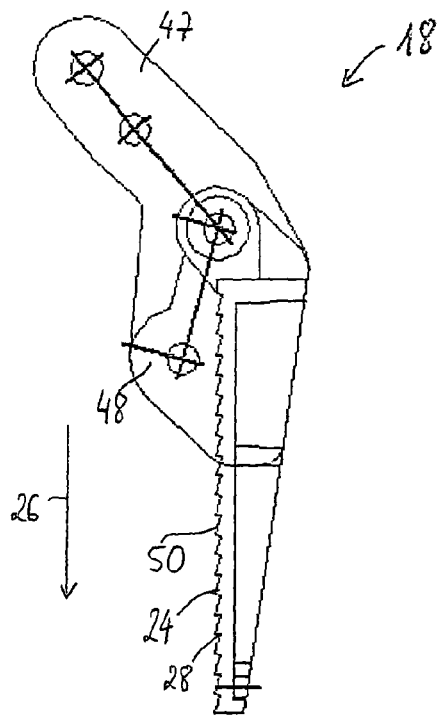
Figure 5:
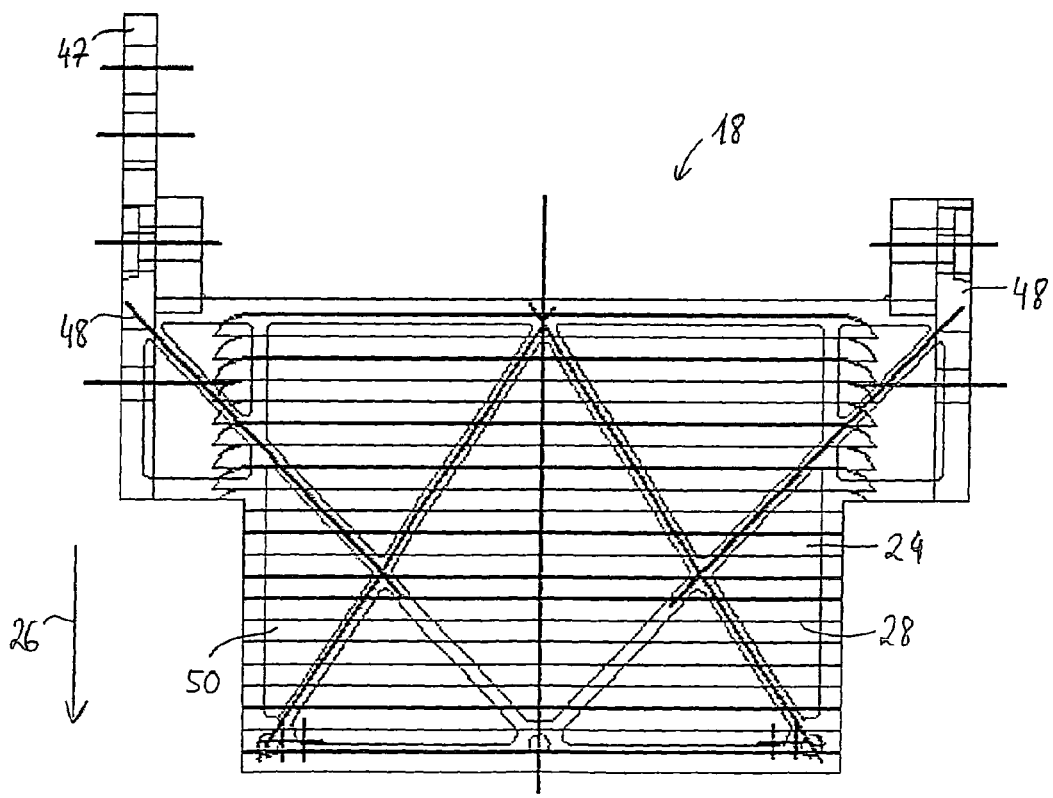
Figure 6:
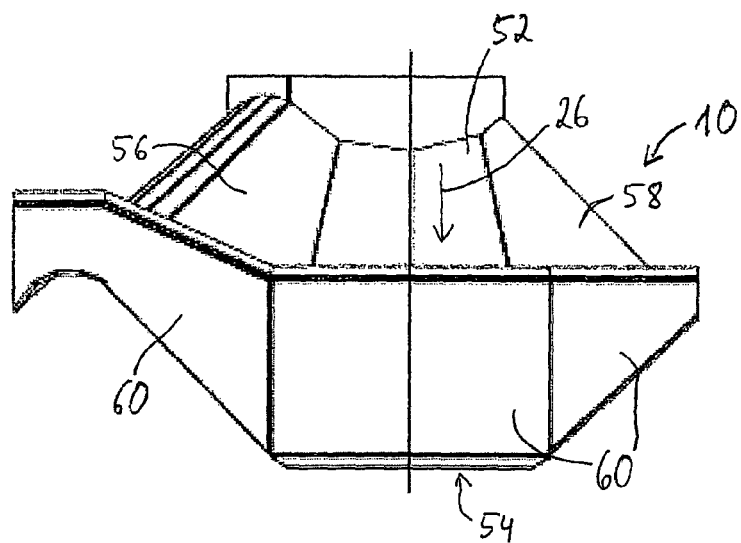
Figures 7, 8:
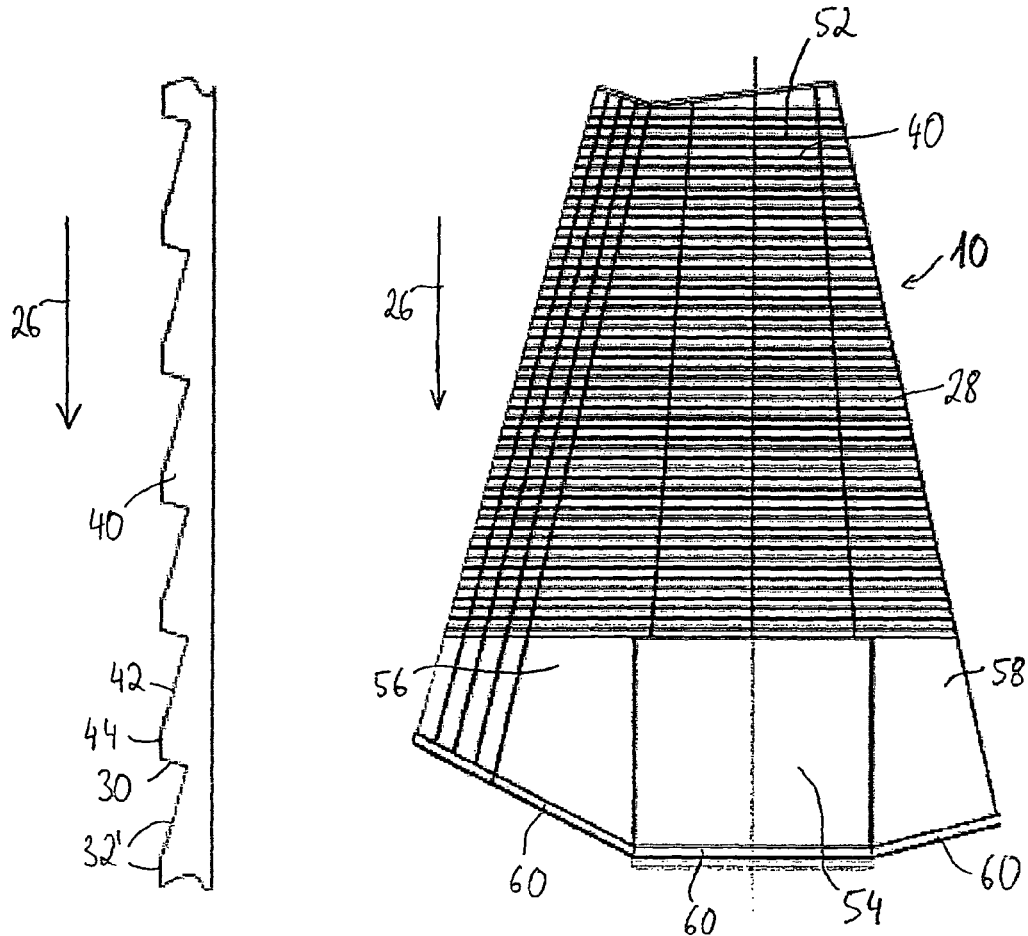

Further features and advantages of the invention are obvious from the description of embodiments on the basis of the enclosed drawings. The figures show:

FIG. 1 a schematic cross-sectional view of a combinatorial weighing apparatus;

FIG. 2 a schematic cross-sectional view along the transporting direction of a product transport surface according to a first embodiment of the present invention;

FIG. 3 a schematic cross-sectional view along the transporting direction of a product transport surface according to a second embodiment of the present invention;

FIG. 4 a side view of a flap of a supply container or of a weighing container, the flap being provided with a product transport surface according to the first embodiment of the present invention;

FIG. 5 a front view of the flap shown in FIG. 4;

FIG. 6 a front view of a conveyor trough;

FIG. 7 a schematic cross-sectional view of the profile of the product transport surface of the conveyor trough shown in FIG. 6; and FIG. 8 a top view on the conveyor trough shown in FIG. 6.

In FIG. 1, a combinatorial weighing apparatus 2 is shown. In the following, the product transporting members having surfaces which are in contact with the product to be weighed and with the weighed product will be explained below. The product is delivered from a transport conveyor 4 onto a central dispersing device 6 having a dispensing edge 8 around which a plurality of conveyor troughs 10 is arranged. Each of these conveyor troughs 10 is connected to a vibration motor 12. Below an end of each conveyor trough 10, which end is facing away from the dispersing device 6, a supply container 14 is arranged. Below each supply container 14, a weighing container 16 is positioned.

Each of the supply containers 14 and the weighing containers 16 comprises two flaps 18 which are arranged opposite to each other and which can be opened for discharging the product from the respective container 14, 16. Each of the flaps 18 is attached to the respective container 14, 16 by a hinge mechanism. The opening and closing of the respective flaps 18 is controlled by a central control unit (not shown) of the combinatorial weighing apparatus. The product discharged from the weighing containers 16 is received in a hopper 20 arranged below the plurality of weighing containers 16. The discharge opening 22 of the hopper 20 discharges the weighed product. The weighed product is, for example, discharged into a packaging machine (not shown).

Accordingly, the product to be weighed is transported by the transport conveyor 4 to the central dispersing device 6, afterwards it is dispensed onto the plurality of conveyor troughs 10. From the outer end of each conveyor trough 10, the product to be weighed is delivered into the supply container 14. By opening the flaps 18 of the supply container 14, the product is discharged into the weighing container 16, wherein the product is weighed. Afterwards, the flaps 18 of the corresponding weighing containers 16 are opened according to a control signal of the central control unit (not shown) of the combinatorial weighing apparatus 2. Accordingly, the weighed product is received in the hopper 20 and discharged through the discharge opening 22 of the hopper 20.

As is obvious from the description above, each of the transport conveyor 4, the central dispersing device 6, the conveyor troughs 10, the supply containers 14, the weighing containers 16, the flaps 18 and the hopper 20 comprise surfaces which are in contact with the transported product. Accordingly, when products having a soft and/or flexible and/or sticky surface are to be weighed in such a combinatorial weighing apparatus 2, some or each of the surfaces of the product transporting members mentioned above are preferably formed as a product transport surface according to the present invention.

In FIG. 2, a schematic cross section of a product transport surface 24 according to a first embodiment of the present invention is shown. The cross section is taken along the transporting direction 26. As mentioned above, the product transport surface 24 is formed of a plurality of grooves 28 extending substantially perpendicular to the transporting direction 26. Each groove is formed by a downward sloping edge 30 and an upward sloping edge 32. The upward sloping edge 32 and the downward sloping edge 30 of two adjacent grooves 28 form a ridge 34.

When viewed in the transporting direction 26, each transition 36 from the upward sloping edge 32 to the downward sloping edge 30 is sharp-edged. Accordingly, each ridge 34 comprises a sharp-edged edge 36 extending perpendicular to the transporting direction 26 and to the plane shown in FIG. 2.

Further, as is obvious from FIG. 2, when viewed in the transporting direction 26, the inclination angle $\alpha$ of the upward sloping edges 32 is smaller than the inclination angle $\beta$ of the downward sloping edges 30. As is obvious from FIG. 2, the inclination angles $\alpha$ and $\beta$ are defined by the angle between the upward and downward sloping edges 32 and 30, respectively, and the plane 46 formed by the product transport surface.

For convenience of description and illustration, in FIGS. 2 and 3, the "plane formed by the product transport surface" is shown as the plane 46 connecting the base edges, i.e. the lower transitions 38 of the plurality of grooves 28 of the product transport surface 24, 40. However, the "plane formed by the product transport surface" may alternatively be shown as a plane connecting the top edges, i.e. the upper transitions 36, of the plurality of ridges 34. Such alternative upper plane would be parallel to the plane 46, as is obvious from FIGS. 2 and 3. Accordingly, the level of the plane has no influence on the definition of the inclination angle.

Further, as is obvious from FIG. 2, when viewed in the transporting direction 26, also the transition 38 from the downward sloping edge 30 to the upward sloping edge 32 of each groove 28 is sharp-edged.

Experiments of the applicants have revealed that sharp-edged transitions 36 and 38 can in particular be achieved by milling the grooves 28 into a steel plate. However, further manufacturing processes and materials are possible to obtain such sharp-edged transitions 36 and 38, as is discussed above.

Preferably, the width L of each groove 28, i.e. the distance between two transitions 36 from the upward sloping edge 32 to the downward sloping edge 30 of adjacent grooves 28, is in the range of 1-20 mm, preferably in the range of 2-10 mm. As is obvious from FIGS. 2 and 3, the distance between the two transitions 36 corresponds, at the same time, to the distance between two transitions 38 from the downward sloping edge 30 to the upward sloping edge 32, 32' of each groove 28. Further, the depth H of each groove is in the range of 0.2-10 mm, preferably in the range of 0.4-5 mm. Further, an angle $\gamma$ between each downward sloping edge 30 and an adjacent upward sloping edge 32 is in the range of 45°-135°, preferably in the range of 70°-110°. This angle $\gamma$ corresponds to the angle $\gamma'$ which is formed between each upward sloping edge 32 and an adjacent downward sloping edge 30, when viewed in the transporting direction 26.

In FIG. 3, a cross section along a product transporting direction 26 of a product transport surface 40 according to a second embodiment of the present invention is shown. The same reference numbers are used for those parts which are identical to the first embodiment shown in FIG. 2. In the following, only the differences with regard to the first embodiment are explained.

In the product transport surface 40, each upward sloping edge 32' is formed of a first upward sloping edge 42 and a second intermediate edge 44. When viewed in the transporting direction 26, the first upward sloping edge 42 is arranged after the preceding downward sloping edge 30, and the second intermediate edge 44 is arranged between each first upward sloping edge 42 and the following downward sloping edge 30.

As is obvious from FIG. 3, the inclination angle of the second intermediate edge 44 differs from the inclination angle α of the first upward sloping edge 42. In particular, in the embodiment shown in FIG. 3, the second intermediate edge 44 is substantially parallel to the plane 46 (as defined above).

In the second embodiment, the width L (as defined above) of each groove 28 is in the range of 1-30 mm, preferably in the range of 2-15 mm. The width $L_2$ of the second intermediate edge 44 along the transporting direction 26 is in the range of 0.2-10 mm, preferably in the range of 0.3-5 mm. A first height H' of the first upward sloping edge 42 with regard to the bottom 38 of the grooves 28 is in the range of 0.2-10 mm, preferably in the range of 0.4-5 mm. A second height H of the second intermediate edge 44 with regard to the bottom 38 of the grooves 28 is in the range of 0.2-10 mm, preferably in the range of 0.4-5 mm. The second height H is, at the same time, the height H of the upward sloping edge 32'. The angle γ between each downward sloping edge 30 and an adjacent first upward sloping edge 42 is in the range of 45°-135°, preferably in the range of 70°-110°.

In FIGS. 4 and 5, a flap 18 for closing and opening a supply container 14 or a weighing container 16 of a weighing apparatus is shown. The flap 18 comprises a lever 47 which is connected to a control arm (not shown) for opening and closing the flap 18. The flap 18 further comprises suspension members 48 by which the flap 18 is attached pivotably to the respective supply container 14 or weighing container 16. The flap surface 50 which is arranged on the inner side of the respective supply container 14 or weighing container 16 is provided with a product transport surface 24 according to the first embodiment of the present invention.

As is obvious from FIG. 4, the respective grooves 28 are extending substantially perpendicular to the transporting direction 26 along which the product is transported when the flap 18 is opened to discharge the product from the respective container 14, 16.

In FIGS. 6 and 8, a conveyor trough 10 according to the present invention is shown. In the perspective schematic view of FIG. 6, only the geometrical form of the conveyor trough 10 is shown. The product transport surface 40 provided on the upper surface of the trough 10 is shown in FIG. 8. In FIG. 7, a cross-sectional view along the transporting direction 26 is shown.

As is obvious from FIG. 6, the conveyor trough 10 comprises a central groove 52 directing the product to be weighed in a transporting direction 26 towards an opening 54 of the trough 10. On both sides of the groove 52, upward sloping side walls 56, 58 are provided such that the product is directed to the central groove 52.

On the side opposite to the groove 52, an upstanding outer wall 60 extends along the opening 54. The upstanding outer wall 60 is also arranged along the outer edges of the side walls 56 and 58.

As shown in FIG. 8, the plurality of grooves 28 extends perpendicular to the transporting direction 26. As shown in the cross-sectional view of FIG. 7, the product transport surface 40 is formed according to the second embodiment of the present invention, as is also shown in FIG. 3.

As is schematically shown in FIG. 6, the conveyor trough 10 is curved in the direction perpendicular to the transporting direction 26. However, the grooves 28 extend along the curved surface, which is only schematically shown in FIG. 8.

This invention is not limited to the embodiments shown in the Figures. In particular, the product transport surfaces can also be provided in other types of weighing apparatuses. Further, the product transport surfaces can be provided on further transporting members of such weighing apparatuses. Such product transport surfaces can also be provided in a packaging machine for transporting the weighed product.

The flap 18 shown in FIGS. 4 und 5 has a profile according to the first embodiment of the present invention, while the conveyor trough 10 shown in FIG. 6 to 8 has a profile according to the second embodiment of the present invention. Conversely, the flap 18 can, of course, also be provided with a product transport surface 40 according to the second embodiment of the present invention, and the conveyor trough 10 can also be provided with a product transport surface 24 according to the first embodiment of the present invention.

As is already discussed with regard to FIG. 6 to 8, the product transport may be curved and the plurality of grooves extends along the curved surface.

The invention claimed is:

1. A weighing apparatus comprising a product transport surface for transporting products thereon in a transporting direction, the product transport surface comprising:
   a plurality of grooves extending substantially parallel to each other and transversely to the transporting direction, wherein
   in a cross section along the transporting direction, upward and downward sloping edges forming the grooves form a saw tooth profile, wherein, when viewed in the transporting direction, each transition from the upward sloping edge to the downward sloping edge of two adjacent grooves is sharp-edged, and
   each upward sloping edge is formed by
      a first upward sloping edge which is arranged after the preceding downward sloping edge when viewed in the transporting direction,
      and a second intermediate edge arranged between the first upward sloping edge and the following downward sloping edge when viewed in the transporting direction,
   wherein the inclination angle of the second intermediate edge differs from the inclination angle (α) of the first upward sloping edge,
   wherein the angle between each downward sloping edge and an adjacent upward sloping edge is in the range of 70°-110°.

2. The weighing apparatus according to claim 1, wherein, when viewed in the transporting direction, the inclination angle (α) of the upward sloping edges differs from the inclination angle (β) of the downward sloping edges.

3. The weighing apparatus according to claim 2, wherein, when viewed in the transporting direction, the inclination angle (α) of the upward sloping edges is smaller than the inclination angle (β) of the downward sloping edges.

4. The weighing apparatus according to claim 1, wherein the grooves extend substantially perpendicular to the transporting direction.

5. The weighing apparatus according to claim 1, wherein, when viewed in the transporting direction, a transition from the downward sloping edge to the upward sloping edge of each groove is sharp-edged.

6. The weighing apparatus according to claim 1, wherein the product transport surface comprises a metal or a synthetic material.

7. The weighing apparatus according to claim 6, wherein the metal is steel.

8. The weighing apparatus according to claim 6, wherein the synthetic material is selected from the group consisting of PE, PVC, PTFE and POM.

9. The weighing apparatus according to claim 1, wherein each second intermediate edge is sloping upward when viewed in the transporting direction and the inclination angle of the second intermediate edge is smaller than the inclination angle ($\alpha$) of the first upward sloping edge.

10. The weighing apparatus according to claim 1, wherein each second intermediate edge is substantially parallel to the plane formed by the product transport surface.

11. A weighing apparatus comprising a product transporting member for transporting a product to be weighed and/or for transporting a weighed product,
the apparatus comprising a transport conveyor, a central dispersing device, a conveyor trough, a flap of a supply container or of a weighing container for discharging product from the respective container, or a hopper of a combinatorial weighing apparatus,
wherein the surface of the product transporting member which gets into contact with the product to be transported is formed as a product transport surface according to claim 1.

12. A weighing apparatus comprising a central dispersing device having a dispersing edge around which a plurality of conveyor troughs is disposed, wherein a supply container is located at an end of each conveyor trough that faces away form the dispersing device, and a weighing container is positioned below each supply container,
wherein at least one of the dispersing device, conveyor trough, the supply container and the weighing container comprises a product transport surface for transporting products thereon in a transporting direction, the product transport surface comprising:
a plurality of grooves each extending substantially across an entire transport surface, and substantially parallel to each other and transversely to the transporting direction,
wherein, in a cross section along the transporting direction, upward and downward sloping edges forming the grooves form a saw tooth profile,
wherein, when viewed in the transporting direction, each transition from the upward sloping edge to the downward sloping edge of two adjacent grooves is sharp-edged.

13. The weighing apparatus of claim 12, wherein each upward sloping edge is formed by:
a first upward sloping edge which is arranged after the preceding downward sloping edge when viewed in the transporting direction, and
a second intermediate edge, following the first upward sloping edge, arranged substantially parallel to a plane made by the product transport surface, the plane defined by connecting base edges of the plurality of grooves.

14. The weighing apparatus of claim 13, further comprising an angle ($\gamma$) between each downward sloping edge and an adjacent upward sloping edge, wherein the angle ($\gamma$) is in the range of 70° to 110°.

15. The weighing apparatus of claim 12, wherein the supply container and the weighing container comprise a flap for opening and closing the container, at least one the flap having said product transport surface.

16. The weighing apparatus of claim 12, wherein each upward sloping edge is formed by:
a first upward sloping edge, which is arranged after the preceding downward sloping edge when viewed in the transporting direction, having a first inclination angle, and
a second intermediate edge, following the first upward sloping edge, having a second inclination angle,
wherein the second inclination angle is smaller than the first inclination angle.

17. The weighing apparatus of claim 16, further comprising an angle ($\gamma$) between each downward sloping edge and an adjacent upward sloping edge, wherein the angle ($\gamma$) is in the range of 70° to 110°.

* * * * *